United States Patent [19]
Iijima et al.

[11] Patent Number: 5,304,356
[45] Date of Patent: Apr. 19, 1994

[54] METHOD FOR THE FIXATION OF CARBON DIOXIDE, APPARATUS FOR FIXING AND DISPOSING CARBON DIOXIDE, AND APPARATUS FOR THE TREATMENT OF CARBON DIOXIDE

[75] Inventors: Masaki Iijima; Masakazu Yamada; Fumio Tomikawa, all of Tokyo; Masaaki Negoro; Masaki Minemoto, both of Takasago; Hisao Haneda, Kobe, all of Japan

[73] Assignee: Mitsubishi Jukogyo Kabushiki Kaisha, Tokyo, Japan

[21] Appl. No.: 790,148

[22] Filed: Nov. 8, 1991

Related U.S. Application Data

[62] Division of Ser. No. 615,691, Nov. 20, 1990, abandoned.

[30] Foreign Application Priority Data

| Nov. 21, 1989 | [JP] | Japan | 1-300807 |
| Dec. 4, 1989 | [JP] | Japan | 1-313485 |
| Apr. 9, 1990 | [JP] | Japan | 2-92115 |
| Sep. 7, 1990 | [JP] | Japan | 2-35754 |

[51] Int. Cl.$^5$ ................................. B01F 5/00
[52] U.S. Cl. .......................... 422/226; 261/DIG. 75; 422/225; 422/227; 422/231
[58] Field of Search ............... 261/DIG. 39, DIG. 54, 261/DIG. 56, DIG. 70, DIG. 75, 76, 77, 78.1, 115, 116, 124; 423/437; 422/224, 257, 225, 226, 227, 231, 243

[56] References Cited

U.S. PATENT DOCUMENTS

| 4,370,304 | 1/1983 | Hendricks et al. | 261/DIG. 75 X |
| 4,514,343 | 4/1985 | Cramer et al. | 261/DIG. 75 X |
| 4,732,682 | 3/1988 | Rymal | 261/DIG. 75 X |

Primary Examiner—James C. Housel
Assistant Examiner—Amalia L. Santiago
Attorney, Agent, or Firm—Jacobson, Price, Holman & Stern

[57] ABSTRACT

An apparatus for reducing the amount of carbon dioxide released into the atmosphere by fixing and dumping carbon dioxide which is disposed in seawater or fresh water satisfying certain temperature and pressure conditions for the formation of carbon dioxide hydrate or its clathrate comprising:

a) a transport pipeline equipped with a compressor;
b) a carbon dioxide source connected to said transport pipeline upstream of said compressor;
c) a plurality of ejector nozzles disposed at one end of the pipeline;
d) a reaction housing which allows seawater or fresh water and carbon dioxide to react with each other and form the carbon dioxide hydrate or its clathrate;
e) a dispersing propeller;

wherein the reaction device is provided with the ejector nozzles and the dispersing propeller at the inlet portion of the device; the concentration of the carbon dioxide is supplied into the pipeline and is discharged by the compressor into the reaction housing from the ejector nozzles under pressure to form the carbon dioxide hydrate or its clathrate; the thus produced hydrate or its clathrate is dispersed by the propeller out of the reaction housing to the deep bottom of the sea.

4 Claims, 14 Drawing Sheets

FIG. 2 (b)

△ 37.5°N., 134.5°E. (TSUSHIMA CURRENT)

| DEPTH (m) | WATER TEMP. (°C) |
|---|---|
| 0 | 10.00 |
| 10 | 10.04 |
| 20 | 9.99 |
| 30 | 9.89 |
| 50 | 9.74 |
| 75 | 9.65 |
| 100 | 9.15 |
| 125 | 7.62 |
| 150 | 7.41 |
| 200 | 4.77 |
| 250 | 2.73 |
| 300 | 1.44 |
| 400 | 0.61 |
| 500 | 0.37 |
| 600 | 0.28 |
| 700 | 0.23 |
| 800 | 0.18 |
| 1000 | 0.15 |
| 1200 | 0.14 |
| 1500 | 0.14 |

□ 41.5°N., 144.5°E. (KURILE CURRENT)

| DEPTH (m) | WATER TEMP. (°C) |
|---|---|
| 0 | 1.97 |
| 10 | 1.95 |
| 20 | 2.03 |
| 30 | 2.11 |
| 50 | 2.22 |
| 75 | 2.28 |
| 100 | 2.23 |
| 125 | 2.43 |
| 150 | 2.33 |
| 200 | 2.37 |
| 250 | 2.49 |
| 300 | 2.62 |
| 400 | 2.87 |
| 500 | 2.96 |
| 600 | 2.98 |
| 700 | 3.00 |
| 800 | 2.91 |
| 1000 | 2.76 |
| 1200 | 2.56 |
| 1500 | 2.29 |

FIG. 3(b)

△ 37.5°N., 134.5°E. (TSUSHIMA CURRENT)

| DEPTH (m) | WATER TEMP. (°C) |
|---|---|
| 0 | 25.29 |
| 10 | 24.36 |
| 20 | 21.72 |
| 30 | 19.05 |
| 50 | 15.62 |
| 75 | 13.33 |
| 100 | 11.47 |
| 125 | 9.58 |
| 150 | 8.49 |
| 200 | 5.78 |
| 250 | 3.50 |
| 300 | 1.99 |
| 400 | 0.61 |
| 500 | 0.35 |
| 600 | 0.23 |
| 700 | 0.21 |
| 800 | 0.17 |
| 1000 | 0.20 |
| 1200 | 0.12 |
| 1500 | 0.14 |

☐ 41.5°N., 144.5°E. (KURILE CURRENT)

| DEPTH (m) | WATER TEMP. (°C) |
|---|---|
| 0 | 19.20 |
| 10 | 18.07 |
| 20 | 12.99 |
| 30 | 9.63 |
| 50 | 5.85 |
| 75 | 4.55 |
| 100 | 3.76 |
| 125 | 3.68 |
| 150 | 3.16 |
| 200 | 2.66 |
| 250 | 2.62 |
| 300 | 2.70 |
| 400 | 2.94 |
| 500 | 3.08 |
| 600 | 3.13 |
| 700 | 3.07 |
| 800 | 2.95 |
| 1000 | 2.72 |
| 1200 | 2.46 |
| 1500 | 2.25 |

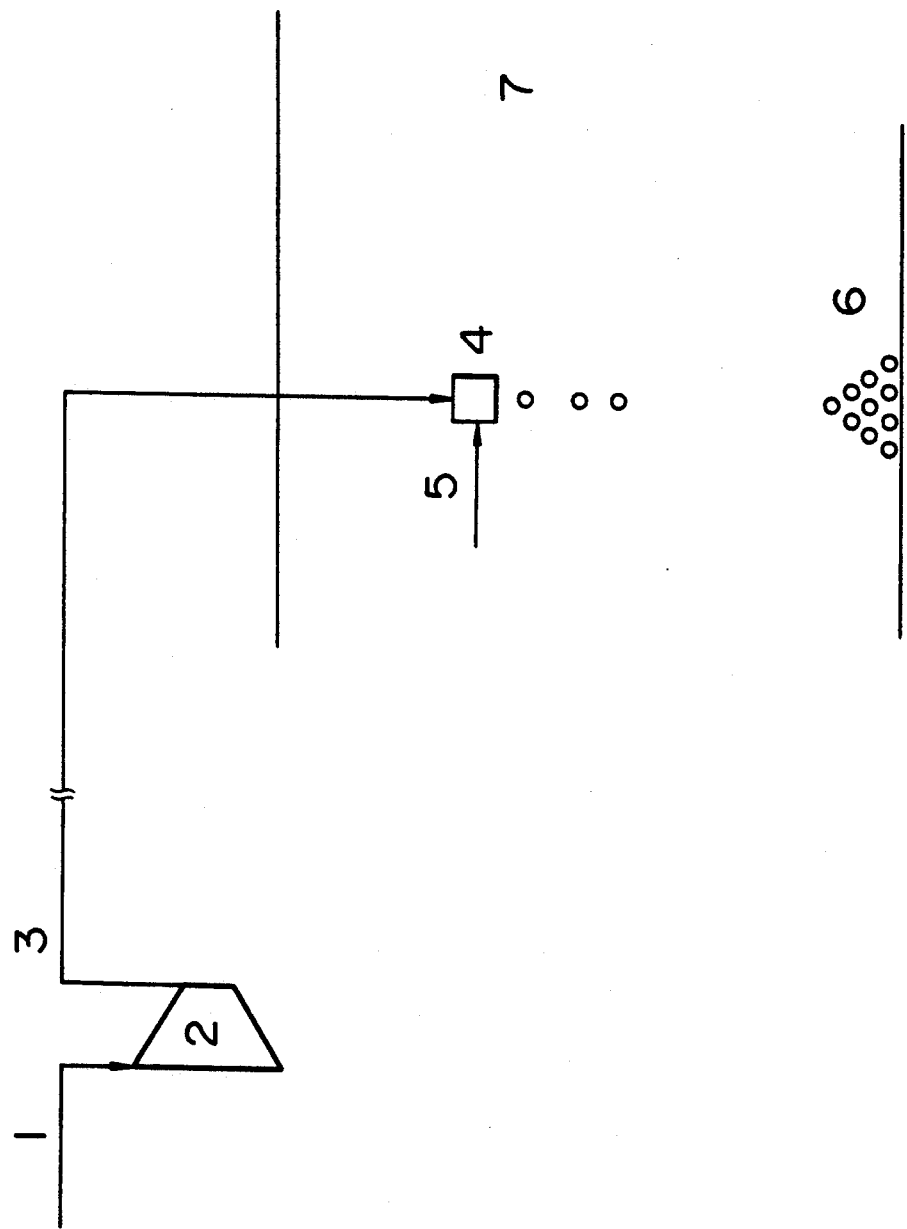

FIG. 7
FIG. 8
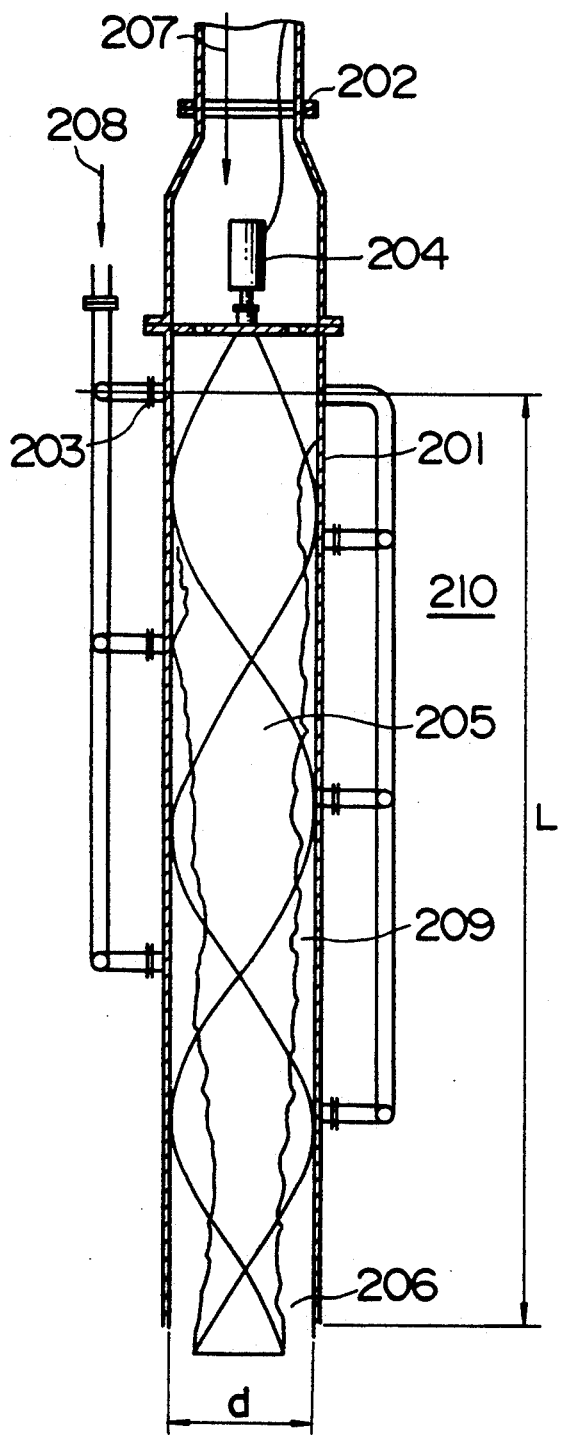
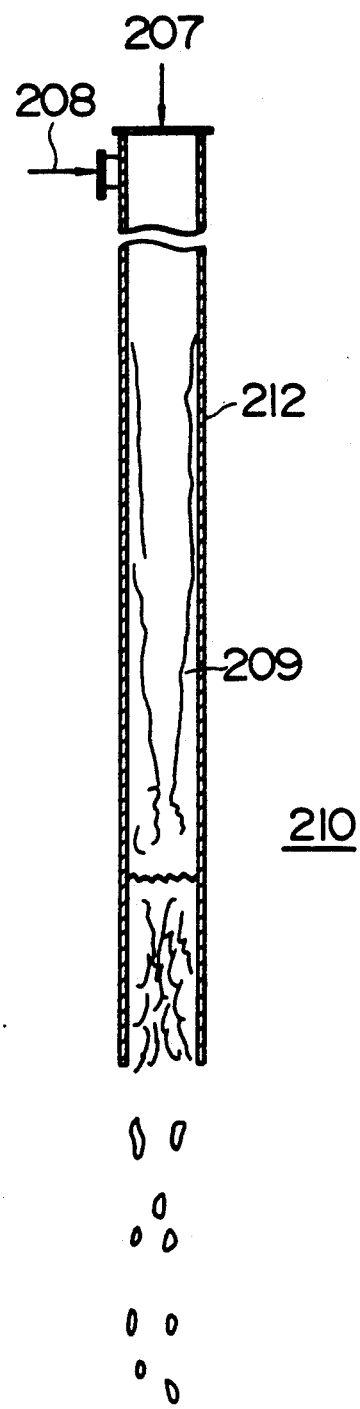

TYPICAL TEMPERATURE
AND SALT CONCENTRATION

METHOD FOR THE FIXATION OF CARBON DIOXIDE, APPARATUS FOR FIXING AND DISPOSING CARBON DIOXIDE, AND APPARATUS FOR THE TREATMENT OF CARBON DIOXIDE

This is a divisional of application Ser. No. 07/615,691 filed Nov. 20, 1990 now abandoned.

FIELD OF THE INVENTION AND RELATED ART STATEMENT

The present invention relates to a method for the fixation of carbon dioxide ($CO_2$) and an apparatus for fixing and disposing carbon dioxide. More specifically, it relates to a method for fixing carbon dioxide and an apparatus useful in carrying out the method in order to prevent environmental disruption, such as warming of the earth, caused by an increase of carbon dioxide in the atmosphere.

Also, it relates to an apparatus for treating carbon dioxide and, more specifically, to an apparatus which reduces the amount of carbon dioxide released into the atmosphere by treating carbon dioxide present in combustion exhaust gas.

Previously, carbon dioxide gas in exhaust gas from the combustion of fossil fuel in common industrial boilers or the like has been released into the atmosphere untreated. Such measure as the separation of carbon dioxide from combustion exhaust gas has almost never been taken for reducing the amount (concentration) of carbon dioxide released.

The concentration of carbon dioxide in the atmosphere has been increasing gradually: It was 315 ppm in 1960, 325 ppm in 1970, and 335 ppm in 1980. It now stands at about 350 ppm. While this increase in the carbon dioxide concentration is considered to be caused by the total effect of various causes, such as deforestation, desertification, the destruction of coral reefs and an increase in population, because the increasing use of fossil fuel, such as coal and oil, coincides more or less with the increase in the carbon dioxide concentration over years, the release of carbon dioxide produced by the combustion of fossil fuel has been inferred as one of major causes of this increase of carbon dioxide in the atmosphere.

An unchecked increase in the atmospheric carbon dioxide will causes higher atmospheric temperatures, the warming of climate and greenhouse effects of the earth. As a result, the melting of antarctic ice, a rise in oceanic temperature, the rise of sea levels, desertification, food shortage and so on would be caused, and the future of mankind might well be endangered. If we keep burning fossil fuel and releasing carbon dioxide in the exhaust gas without any treatment, the carbon dioxide concentration in the atmosphere will most certainly increase further.

In order to prevent this increase in the carbon dioxide concentration, the following methods have been reported for disposing carbon dioxide without releasing it into atmosphere and for disposing carbon dioxide collected from the atmosphere:

(1) Carbon dioxide is dissolved into seawater and disposed in the ocean. The seawater which has dissolved carbon dioxide has a larger specific gravity and therefore goes down to the bottom of sea.

(2) Because liquid carbon dioxide has a larger specific gravity than the surrounding seawater under the pressure and the temperature of deep sea at a depth of more than 3,000M carbon dioxide can be disposed in the ocean at that depth as liquid carbon dioxide.

According to method (1), however, the seawater which has dissolved carbon dioxide diffuses out to a broad area with ocean flow and may affect the ecological system of oceanic life. Also, according to method (2), it takes a large amount of energy and equipment for maintaining temperature to liquify carbon dioxide and then to introduce it to a depth of more than 3,000 m, and in much the same way as method (1) carbon dioxide may diffuse broadly in the sea as well.

OBJECT AND SUMMARY OF THE INVENTION

An object of the present invention is to provide a method for safely and stably fixing carbon dioxide collected from exhaust gas or the atmosphere so that it would not diffuse in seawater or fresh water and affect the ecological system of marine life. It is also to provide an apparatus for fixing and disposing carbon dioxide which makes it possible to safely and stably fix carbon dioxide and sink and dispose it to an ocean floor or the bottom of a lake.

Another object of the present invention is to provide an apparatus for separating and collecting all or a part of carbon dioxide present in exhaust gas from the combustion of fossil fuel and for fixing it so that it would not be released again into the atmosphere in order to slow down the increase of carbon dioxide in the atmosphere.

The present invention provides:

a method for the fixation of carbon dioxide which is characterized by the steps of letting carbon dioxide and seawater or fresh water come into contact with each other at temperatures and pressures required for the formation of carbon dioxide hydrate so as to produce carbon dioxide hydrate, which may be in a clathrate form, and sinking it in seawater or fresh water which satisfies the conditions for the stability of carbon dioxide hydrate;

a method for the fixation of carbon dioxide which is characterized by the steps of supplying and mixing seawater or fresh water with carbon dioxide in a pressurized pipeline, leading and cooling the mixture by a pipeline to a position in an ocean where the temperature condition for the formation of carbon dioxide hydrate corresponding to a given pressurization pressure is satisfied to produce carbon dioxide hydrate or its clathrate, and discharging the product into the seawater which satisfies the pressure and temperature conditions for the stability of carbon dioxide hydrate or its clathrate;

an apparatus for fixing and dumping carbon dioxide which apparatus is disposed in seawater or fresh water satisfying the pressure and temperature conditions for the formation of carbon dioxide hydrate and which comprises a container for letting carbon dioxide and seawater or fresh water come into contact with each other, and a discharge means for discharging carbon dioxide hydrate thus produced, which may be in a clathrate form, out of the container; and an apparatus for the treatment of carbon dioxide which comprises a reaction device which is disposed on a deep ocean floor for producing carbon dioxide hydrate by letting seawater and carbon dioxide react with each other, a pipeline for the transportation of concentrated carbon dioxide to the reaction device, and ejector type nozzles or means disposed at an end of the pipeline for dispersing carbon dioxide hydrate or its clathrate produced in the reaction device over the deep ocean floor.

First, the present invention manifests itself as a method for fixing carbon dioxide ($CO_2$) which is characterized by the steps of exposing carbon dioxide to seawater or fresh water under pressures and temperatures required for producing carbon dioxide hydrate, which may include clathrate hydrate, and sinking the resultant carbon dioxide hydrate into the sea or fresh water which satisfies the conditions for the hydrate to be stable.

With reference to FIG. 1, we shall describe the relation between pressure and temperature at which carbon dioxide hydrate is produced.

In FIG. 1, Kv-s values represent equilibrium data of carbon dioxide hydrate. The conditions for carbon dioxide hydrate production are met at temperature and pressure at which the Kv-s value is 1.0 or less.

Also, Table 1 shows the relation between water depth and temperature at which carbon dioxide hydrate can be produced in an ordinary sea. If the water depth is greater, the pressure becomes larger, and therefore carbon dioxide hydrate may be produced at higher temperatures corresponding to a larger depth.

TABLE 1

| Water Depth | $CO_2$ Hydrate Production Temp. Fresh Water | $CO_2$ Hydrate Production Temp. Seawater |
| --- | --- | --- |
| 166 (m) | 2.7 (°C.) | 1.6 (°C.) |
| 201 | 4.2 | 3.3 |
| 236 | 5.5 | 4.7 |
| 271 | 6.4 | 5.6 |
| 341 | 8.2 | 7.4 |
| 412 | 9.4 | 8.6 |
| 482 | 10.6 | 9.7 |
| 553 | 11.6 | 10.6 |
| 623 | 12.3 | 11.3 |
| 693 | 13.0 | 12.0 |

Next, we shall explain the specific gravity of carbon dioxide hydrate and seawater.

The specific gravity of carbon dioxide hydrate is about 1.129 and known to be affected little by temperature or pressure. Also, the specific gravity of seawater under the atmospheric pressure is about 1.03, and that of fresh water is less than this value. Even if water depth increases and pressure becomes higher, the specific gravity of water undergoes only a small increase which is negligible compared to the specific gravity of carbon dioxide hydrate. Therefore, if the product carbon dioxide hydrate is left in seawater or in fresh water, it automatically goes down. In the case of the ocean, it will accumulate on the ocean floor, and carbon dioxide can be fixed safely and stably.

Carbon dioxide is pressurized and mixed with seawater or fresh water in the seawater or fresh water which satisfies the temperature and pressure conditions for producing carbon dioxide hydrate so as to produce carbon dioxide hydrate. Because the specific gravity of carbon dioxide hydrate is about 1.129 and greater than that of seawater or fresh water, it goes down to the bottom of the water. If it is to be placed in the ocean, though there are some differences depending on a sea area, the pressure and temperature conditions for producing carbon dioxide hydrate are met at a depth of more than 200 to 500 M near Japan.

FIGS. 2(a)-2(b) show the vertical distribution of water temperature in the ocean near Japan in February. ○ indicates a point in the Kuroshio Current area which is located 100 km south from Ushio Promontory at latitude 32.5 degrees north and longitude 135.5 degrees east, △ a point located 200 KM north from Tottori, a prefecture in Japan, at latitude 37.5 degrees north and longitude 134.5 degrees east in the Tushima Current area, and □ a point located 150 KM southeast from Erimo Promontory at latitude 41.5 degrees north and longitude 144.5 degrees east in the Kurile Current area.

The shaded portion in FIG. 2 indicates the range which is found to be able to produce carbon dioxide hydrate from the data in Table 1.

According to FIGS. 2(a)-2(b), in February near Japan, carbon dioxide hydrate can be produced at a depth deeper than 120 M at latitude 41.5 degrees north and longitude 144.5 east, or 220 M at latitude 37.5 degrees north and longitude 134.5 east, or 500 M at latitude 32.5 north and longitude 135.5 east, respectively.

FIGS. 3(a)-3(b) show the vertical distribution of water temperature in August at the same three points near Japan as in FIGS. 2(a)-2(b).

The shaded portion in FIG. 3 indicates the range which is found to be able to produce carbon dioxide hydrate from the data in Table 1. According to FIG. 3, it is found that in August near Japan carbon dioxide hydrate can be produced at a depth deeper than 160 M at latitude 41.5 degrees north and longitude 144.5 east, or 220 M at latitude 37.5 degrees north and longitude 134.5 degrees east, or 450 M at latitude 32.5 degrees north and longitude 135.5 degrees east, respectively.

As shown in FIGS. 2(a)-2(b) and 3(a)-3(b), because an ocean floor provides more stable conditions for carbon dioxide hydrate compared to an upper region of the ocean, the carbon dioxide hydrate accumulated on an ocean floor is kept in a stable condition.

It is also possible to produce carbon dioxide hydrate on the ground or on the sea and discharge it in the sea. In this case, the carbon dioxide hydrate produced is maintained so as not to dissolve or vaporize until it reaches the part of the ocean where conditions for the stability of carbon dioxide hydrate are met. If carbon dioxide hydrate sinks further and accumulates on an ocean floor, it will be kept in a stable manner and remain there.

The method for fixing carbon dioxide of the present invention described above can stably accumulate carbon dioxide collected from combustion exhaust gas or atmosphere at one place as carbon dioxide hydrate without its diffusion in the ocean or in fresh water so as not to affect the ecological system of the ocean or the fresh water, compared to the conventional method of dissolving carbon dioxide into seawater or of dumping in the ocean as liquid carbon dioxide.

Also, this method of the present invention is capable of saving much energy in comparison with the method of dumping liquid carbon dioxide into the ocean or fresh water and therefore suitable for fixing large amounts of carbon dioxide.

Secondly, the present invention manifests itself as another method of fixing carbon dioxide. This method is characterized by the steps of supplying and mixing fresh water or seawater into carbon dioxide in a pressurized pipeline, cooling to produce carbon dioxide hydrate by leading the mixture into the part of the ocean whose temperature satisfies the conditions for producing carbon dioxide hydrate under a given pressurization pressure, and releasing it into the seawater which has temperature and pressure at which carbon dioxide hydrate is stable.

In this method of the present invention also, in the same way as the first method of the present invention described above, carbon dioxide ($CO_2$) is pressurized, and carbon dioxide hydrate is produced by mixing it with fresh water or seawater under the temperature and pressure conditions for producing carbon dioxide hydrate. Because carbon dioxide hydrate is a solid, if a pipeline becomes stuffed by carbon dioxide hydrate and transportation becomes difficult, fresh water or seawater can be supplied in excess so as to produce a mixture (or a slurry) of carbon dioxide hydrate and an excess of the supplied fresh water or seawater for easier transportation in a pipeline. Also, the heat of formation generated when carbon dioxide hydrate is produced 80 kcal per kg of carbon dioxide hydrate) is released through the pipeline into the ocean so that carbon dioxide can be produced and discharged into seawater.

Because the specific gravity of carbon dioxide hydrate is about 1.129 and greater than that of seawater and fresh water, the hydrate goes down to the bottom of the ocean. In the case of releasing into the ocean, while it depends on a sea area, a depth of more than 200 to 500M would satisfy the pressure and temperature conditions for the stability of carbon dioxide hydrate around Japan.

In collecting carbon dioxide from combustion exhaust gas or atmosphere and preventing an increase of carbon dioxide in the atmosphere, this method of fixing carbon dioxide of the present invention is capable of stably accumulating carbon dioxide as carbon dioxide hydrate at one place without letting it diffuse away into the ocean so as not to affect the ecological system of the ocean, compared to the conventional method of dissolving collected carbon dioxide into seawater or that of dumping the same as liquid carbon dioxide into the ocean.

Also, this method of fixing carbon dioxide of the present invention can save energy because it uses seawater for cooling carbon dioxide and water to a temperature at which carbon dioxide hydrate can be produced and to remove its heat of formation.

Thirdly, the present invention manifests itself as an apparatus for fixing and disposing carbon dioxide which is characterized in that it is disposed in the seawater or fresh water which satisfies the temperature and pressure conditions for producing carbon dioxide, and it comprises a container for bringing carbon dioxide and seawater or fresh water into contact with each other, and a discharge means for discharging the product carbon dioxide hydrate out of the container.

This apparatus is, as shown in FIG. 9, placed in the seawater or fresh water or the like which satisfies the temperature and pressure conditions required for the production of carbon dioxide hydrate.

The apparatus produces carbon dioxide hydrate by sending carbon dioxide into the water (which may be water in the surrounding) which has the temperature and the pressure required for the production of carbon dioxide hydrate in a production container so that they come into contact with each other.

Carbon dioxide hydrate generates the heat of formation when it is produced. This heat can be released into surroundings through container walls, and the temperature condition required for the production of carbon dioxide hydrate can be maintained sufficiently.

Carbon dioxide hydrate is a solid, and a discharge means is required for preventing it from adhering to container walls. For this purpose such discharge means as one which uses rotation of a screw and one which discharges carbon dioxide hydrate using the pressure of carbon dioxide and water supplied for the production of carbon dioxide hydrate may be adopted.

The carbon dioxide hydrate discharged from the outlet of the production container goes down to the bottom of the sea or a lake and accumulates there because it has a specific gravity which is larger than that of the surrounding seawater or fresh water.

According to this apparatus of the present invention the following effects can be achieved:
(1) While the release of carbon dioxide produced in the combustion of fossil fuel or the like into the atmosphere may leads to the disruption of global environment, such as warming phenomena of climate, the apparatus described above can change carbon dioxide collected from combustion exhaust gases into carbon dioxide hydrate and fix it in a stable state and dump it. Thus it is very effective in helping prevent global environmental disruption.
(2) The size and the number of the apparatus can be adjusted according to the amount of carbon dioxide to be treated. Also, because carbon dioxide hydrate can be produced continuously, this apparatus is suitable for processing large amounts of carbon dioxide.
(3) This apparatus is movable and can be operated at a location (underwater, for example) where carbon dioxide hydrate is stored or dumped.

Fourthly, the present invention manifests itself as another apparatus for the treatment of carbon dioxide which is characterized in that it is disposed on an ocean floor and that it comprises a reaction device for letting carbon dioxide react so as to produce carbon dioxide hydrate, a pipeline for transporting concentrated carbon dioxide to the reaction device, at least one ejector nozzle disposed at an end of the pipeline, and a means for dispersing carbon dioxide hydrate produced in the reaction device over a deep ocean floor.

Combustion exhaust gas is a major source of carbon dioxide. Known as a conventional technique is a method of introducing to a separate system all or a part of exhaust gas which has previously been discharged into the atmosphere from a smokestack, and releasing the exhaust gas as purified gas into the atmosphere after carbon dioxide is removed therefrom. For example, an absorbent such as zeolite can be used to carry out the selective absorption and desorption of carbon dioxide, or an absorbent such as 2-alkoxyamine can also used for the chemical absorption and release of carbon dioxide. With these absorbents carbon dioxide can be separated as a concentrated gas of more than 90%.

This apparatus of the present invention is for treating highly concentrated carbon dioxide gas thus separated. The apparatus sends this gas to a deep ocean floor under pressure through a pipeline having an ejector type nozzle and spouts a fine mixture of seawater and carbon dioxide at the ocean floor so as to produce by deposition a crystalline compound (carbon dioxide hydrate or a clathrate thereof). This carbon dioxide hydrate does not decompose and is stable under the conditions of a deep ocean floor, and because its specific gravity is larger than that of seawater, it does not go up.

We shall now describe a mechanism by which carbon dioxide is produced from a mixture of carbon dioxide and seawater.

FIG. 13, in which the vertical axis represents pressure in a logarithmic scale, and the horizontal axis temperature, shows phase equilibrium between $CO_2$ and $H_2O$, and indicates the state (gas, liquid, solid) of $CO_2$ and $H_2O$ under given temperature and pressure conditions. In the shaded area between 0° C. and 10° C. (12.4–3.5 atm at 0° C. and 44 atm at 10° C.) $CO_2$ and $H_2O$ react with each other to produce carbon dioxide hydrate according to the following equation:

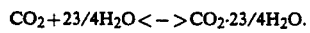

$$CO_2 + 23/4 H_2O < - > CO_2 \cdot 23/4 H_2O.$$

The hydrate thus produced has a crystal structure in which a $CO_2$ molecule is held in a crystalline body of water which is a three-dimensional skeleton of a polyhedron with 14 or 16 faces. It is a solid which does not easily dissolve in water. The specific gravity of this hydrate is 1.129 and larger than that of seawater in the depths (1.05 to 1.07). When it is placed outside the area of temperature and pressure described above (more than 10° C., for example), however, the hydrate decomposes to separate carbon dioxide again. FIG. 14 shows typical depths and water temperatures as well as salt concentrations in the ocean. If the depth is more than approximately 600M, water temperature is 10° C. or less. Therefore, carbon dioxide is pressurized and sent to an ocean floor of this depth, conditions for the production of carbon dioxide hydrate can be satisfied.

Also, because pressure increases by 1 atm with every 10M increase in depth, it is 50 atm at a depth of 500M and conditions for producing carbon dioxide hydrate are met. When carbon dioxide is spouted at a deep ocean floor, if gas bubbles are large the reaction will be slow, and unreacted carbon dioxide simply will go up in the water without reacting. Therefore, it is necessary to use an ejector nozzle so as to mix seawater and carbon dioxide well and spout fine babbles. Further, a reaction container is used for securing enough reaction time and for avoiding the rise of unreacted carbon dioxide babbles, such that carbon dioxide hydrate can be produced efficiently.

According to this apparatus of the present invention, it is possible to produce carbon dioxide hydrate at a deep ocean floor and fix it on an ocean floor almost permanently. Furthermore, because this apparatus uses natural environmental conditions available on a deep ocean floor, it requires less energy than other methods to an industrial advantage.

This apparatus is, therefore, effective and useful in reducing carbon dioxide gas present in combustion exhaust gas released into the atmosphere.

BRIEF DESCRIPTION OF THE DRAWINGS

FIGS. 2(a)–2(b) show vertical temperature distributions in the sea near Japan in February and a range suitable for carbon dioxide ($CO_2$) hydrate production;

FIGS. 3(a)–3(b) show vertical temperature distributions in the sea near Japan in August and a range suitable for carbon dioxide ($CO_2$) hydrate production;

FIG. 4 shows embodiment 1 of a first method of fixation of the present invention;

FIG. 7 shows a schematic diagram of embodiment 4 for a first apparatus of the present invention;

FIG. 8 shows a schematic diagram of embodiment 5 for the first apparatus of the present invention;

DETAILED DESCRIPTION OF PREFERRED EMBODIMENTS

Embodiment 1

Figure 1:
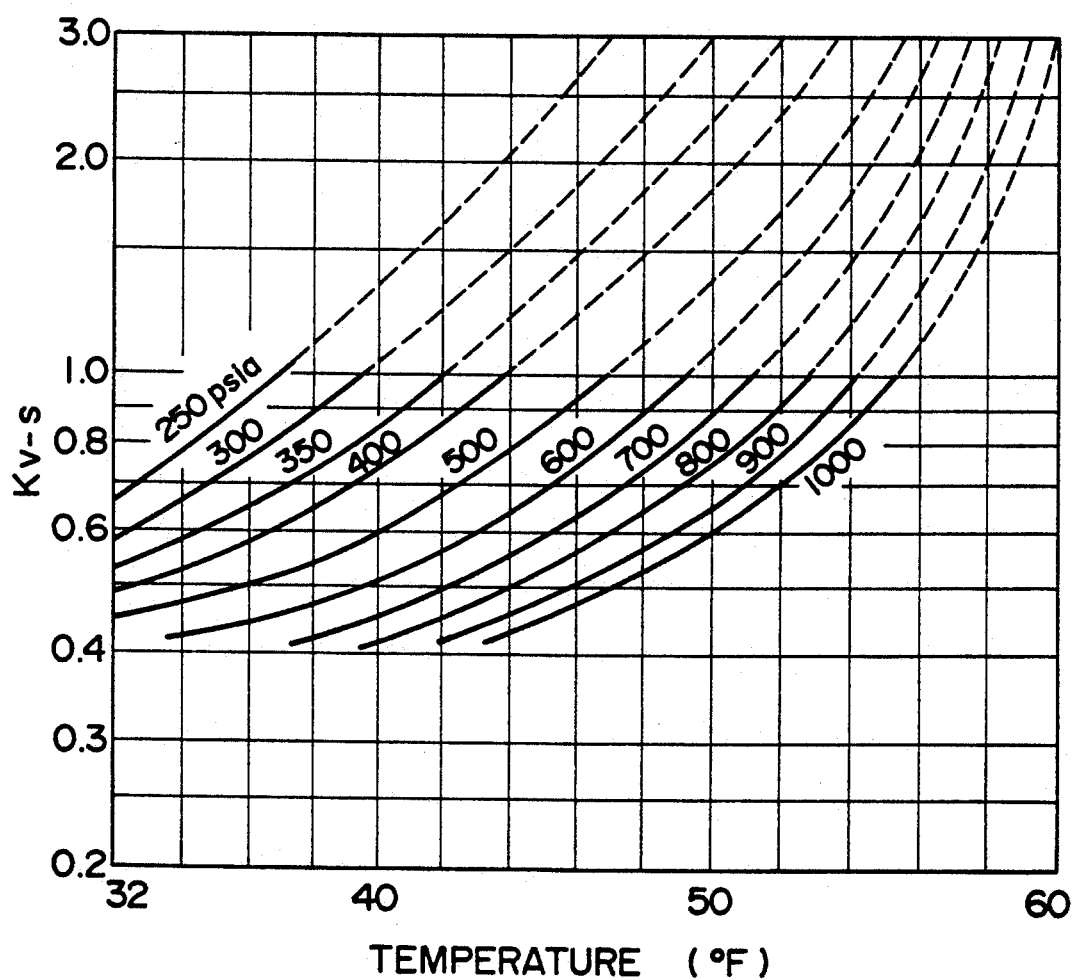
FIG. 1 is a graph showing equilibrium of carbon dioxide hydrate.
Figure 2A:
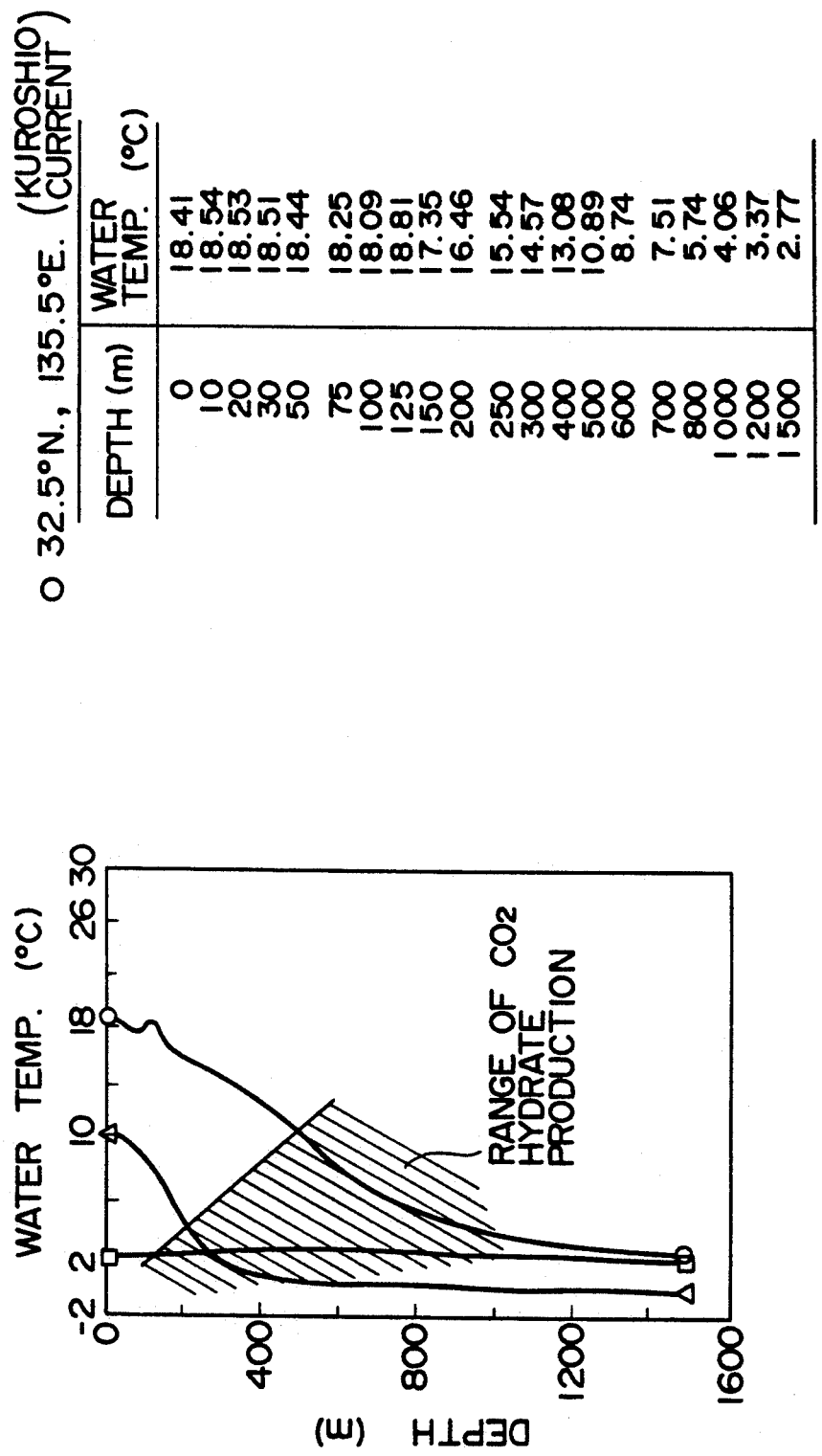
Figure 3A:
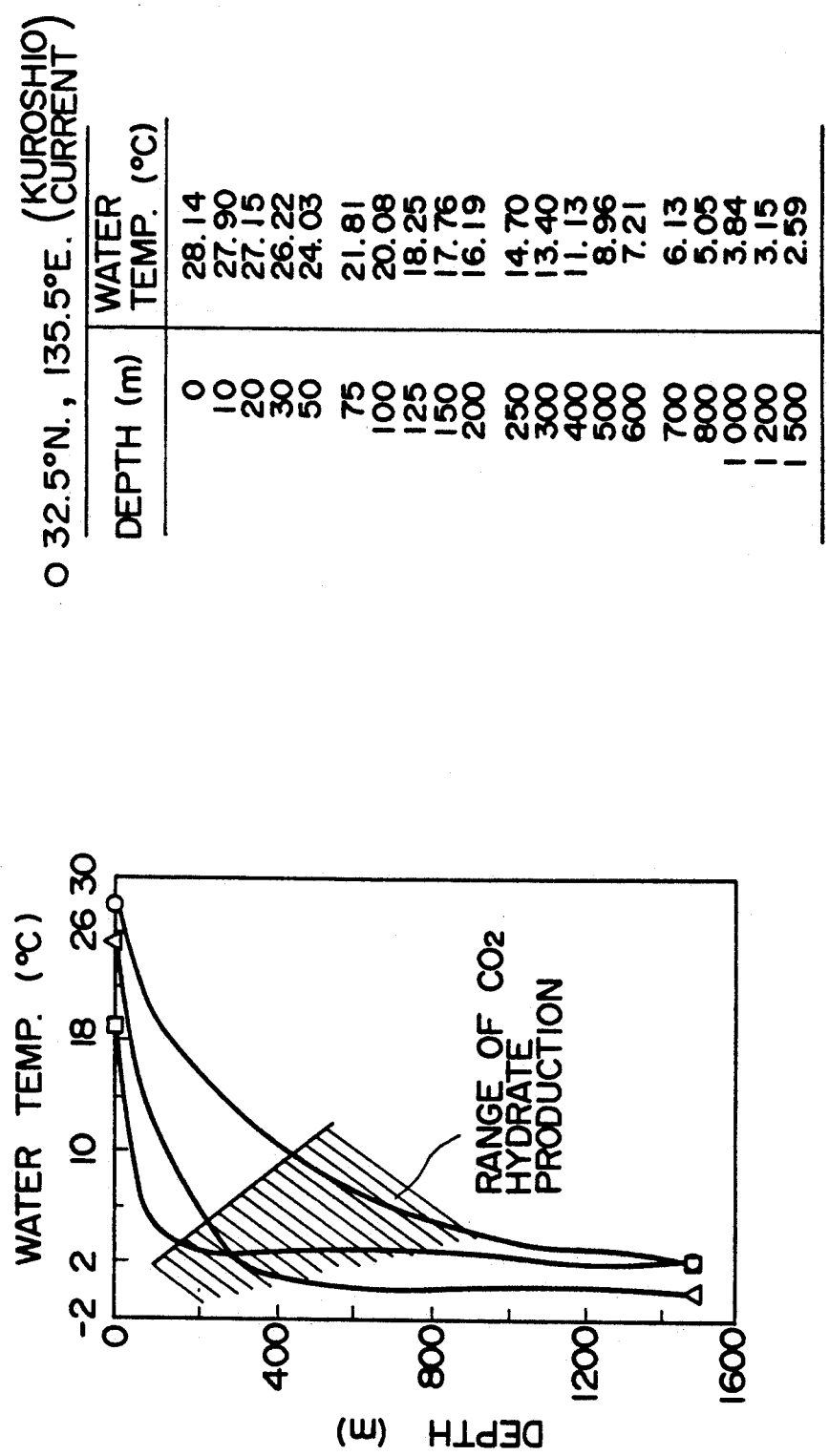

Embodiment 1 of the present invention will be described with reference to FIG. 4 and Table 2.

TABLE 2

| | |
|---|---|
| $CO_2$ gas boost pressure | 25 kg/cm² gauge pressure |
| Location of $CO_2$ hydrate production apparatus | Latitude 41.5° north Longitude 144.5° east |
| Placement depth of the apparatus | 200 m |
| Water temperature there in Feb. | 2° C. |
| Water temperature there in Aug. | 3° C. |

Carbon dioxide gas 1 is pressurized to a gauge pressure of 25 kg/cm² by a booster 2 and led to a production device 4 for the production of carbon dioxide hydrate located at a depth of 200 m in the area of latitude 41.5° north and longitude 144.5° east through line 3. The temperature of seawater at the depth of the location of the production device 4 is 2° C. in February and 3° C. in August, and the temperature and pressure conditions for the production of carbon dioxide hydrate are satisfied sufficiently. The carbon dioxide hydrate produced in the production device 4 goes down in seawater and accumulates on an ocean floor.

Embodiment 2

Figure 5:
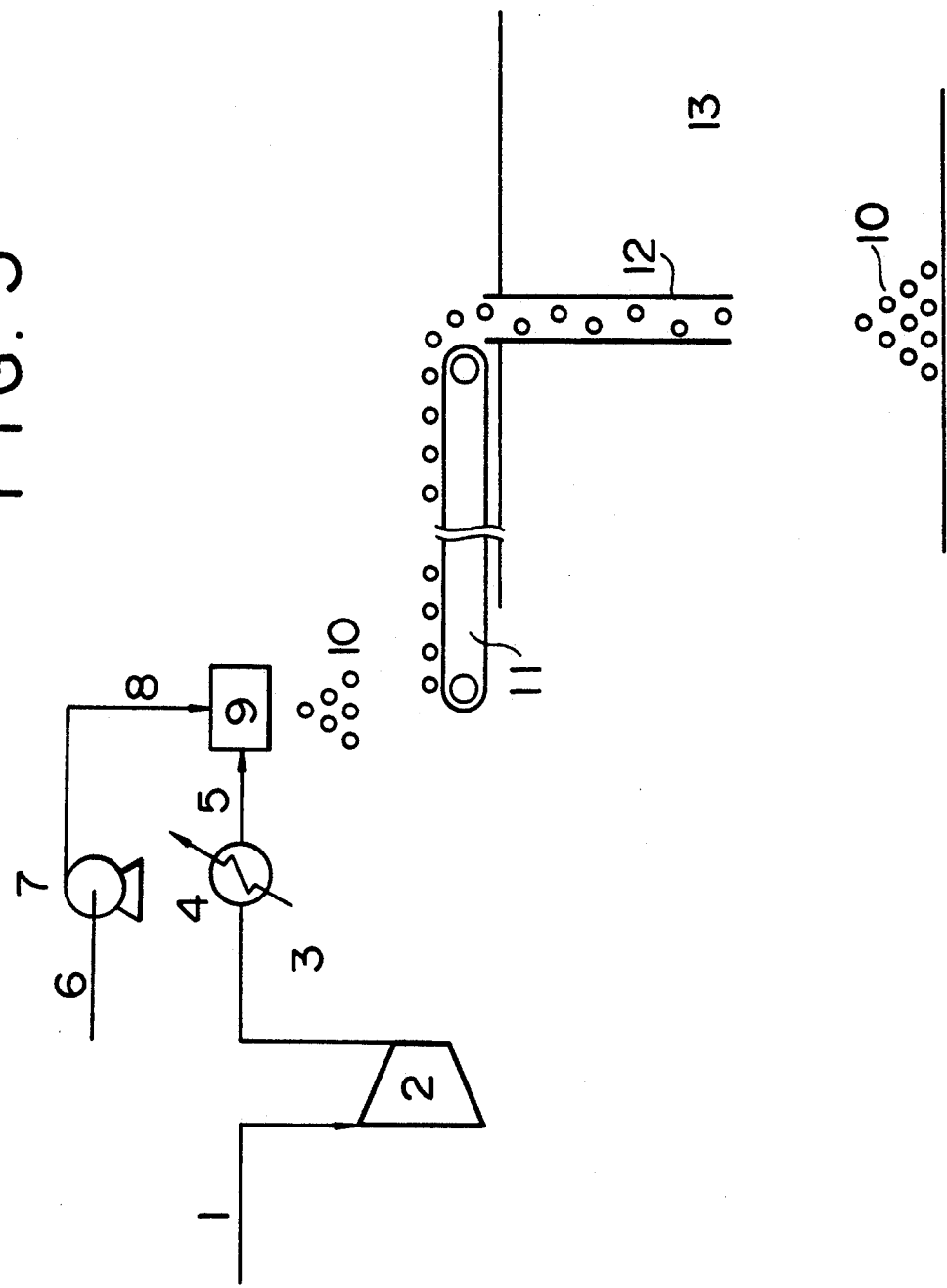
FIG. 5 shows embodiment 2 of the first method of fixation of the present invention.

Embodiment 2 of the present invention will be explained with reference to FIG. 5 and Table 3.

TABLE 3

| | |
|---|---|
| $CO_2$ gas boost pressure | 25 kg/cm² gauge pressure |
| Cooling temp. of $CO_2$ gas | 3° C. |
| Temp. of supplied water (fresh water or seawater) | 3° C. |
| Location of disposing $CO_2$ hydrate | Latitude 41.5° north Longitude 144.5° east |
| Depth of $CO_2$ hydrate disposal | 200 m |
| Water temperature there in Feb. | 2° C. |
| Water temperature there in Aug. | 3° C. |

Carbon dioxide gas 1 is pressurized to 25 kg/cm² by a booster 2 and led to a cooling device 4 through line 3. The gas is cooled to 3° C. at the cooling device and led to an apparatus 9 for producing carbon dioxide hydrate through line 5. Also, fresh water or seawater 6, temperature of which is 3° C., is pressurized to 20 kg/cm² gauge pressure by a pump 7 and led to the apparatus 9 for producing carbon dioxide through line 8 to produce carbon dioxide hydrate. This carbon dioxide hydrate 10 is led to a depth of 200 m at latitude 41.5 degrees north and longitude 144.5 degrees east through a carbon dioxide hydrate carrier 11 and a descendent pipe 12 for carrying carbon dioxide hydrate down into the sea while maintaining its condition. The temperature in this sea area is 2° C. in February and 3° C. in August. Carbon dioxide hydrate 10 remains stable under these conditions. It goes down into the sea 13 and accumulates on an ocean floor and is kept there in a stable manner.

Embodiment 3

Figure 6:
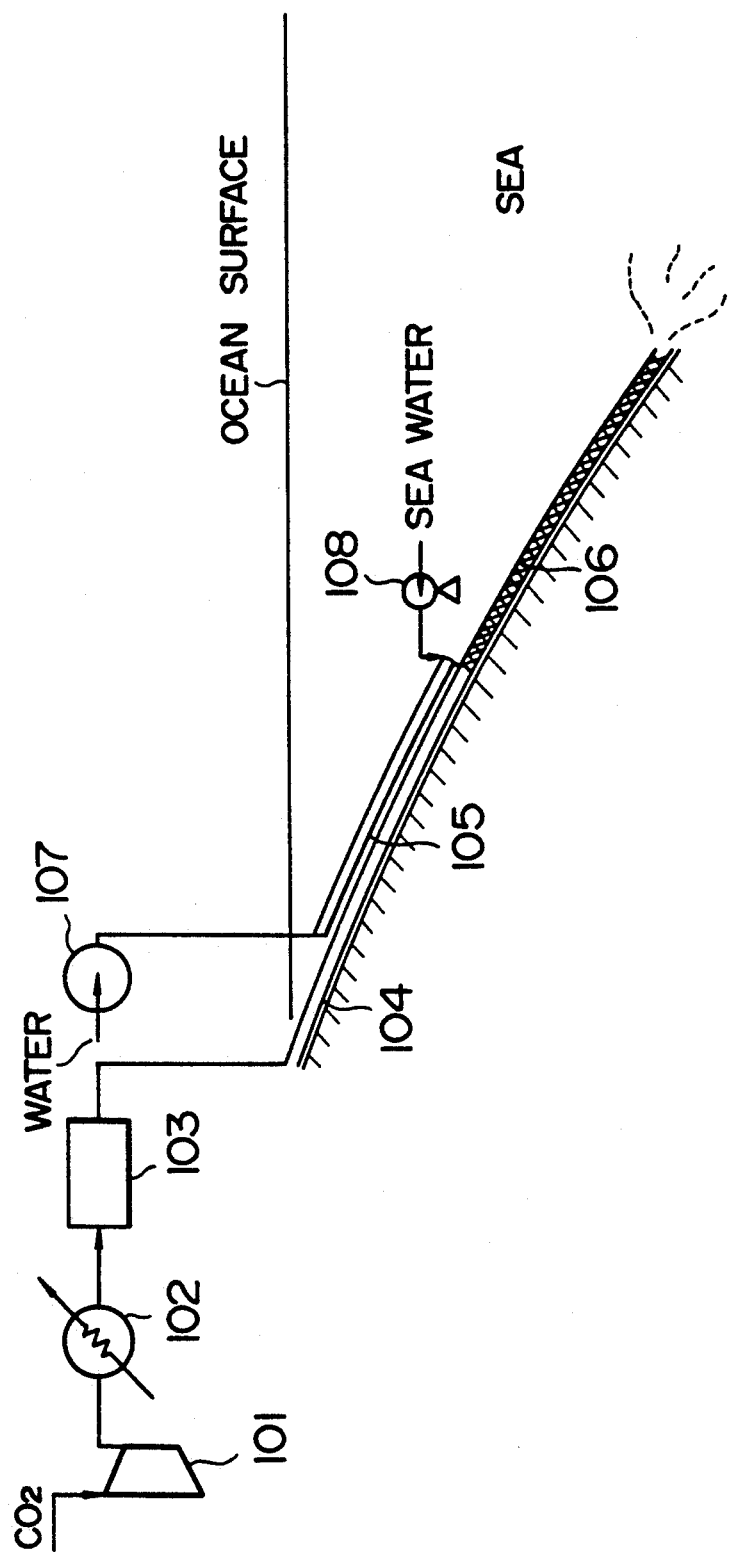
FIG. 6 shows embodiment 3 of a second method of fixation of the present invention.

As shown in FIG. 6 as an example, carbon dioxide ($CO_2$) collected from combustion exhaust gas is pressurized by a compressor 101 and cooled by a cooling device 102. Water which comes with $CO_2$ is condensed and removed by a dehydrator 103. The $CO_2$ which has now become free of water is transported in the seawater through a $CO_2$ pipeline 104 to an ocean floor and cooled indirectly by the seawater, temperature of which goes down gradually with depth.

Also, the water which has been pressurized by a water pump 107 is transported through a water pipeline 105 laid along the $CO_2$ pipeline 104 and is cooled by the surrounding seawater.

At a point where temperature satisfies the conditions for the formation of carbon dioxide hydrate for a given value of the pressure of carbon dioxide, the water in the water pipeline 105 is supplied to the $CO_2$ pipeline and mixes with carbon dioxide to produce carbon dioxide hydrate.

Also, instead of using the water pump 107 and the water pipeline 108, the surrounding cold seawater can be supplied to the $CO_2$ pipeline 104 by way of an underwater pump 108.

The position at which water is supplied has no restrictions because even if carbon dioxide or water (either fresh water or seawater) is mixed in before temperature reaches a desired value, carbon dioxide hydrate would start forming when the mixture is cooled down to such temperature by the seawater surrounding the $CO_2$ pipeline 104 as it is carried downward.

Furthermore, because carbon dioxide hydrate thus produced is a solid, the $CO_2$ pipeline 104 may be stuffed up as carbon dioxide hydrate forms. However, if water is supplied in excess, this can be avoided because after the hydrate is produced a mixture of water and the hydrate, i.e., a carbon dioxide hydrate slurry, forms.

While the seawater pressure in the $CO_2$ pipeline 104 near the region of hydrate production can be small, the temperature and pressure conditions for the stability of carbon dioxide hydrate 106 have to be satisfied at the point where carbon dioxide hydrate has sufficiently formed and where carbon dioxide hydrate 106 or its slurry is discharged from the $CO_2$ pipeline 104. The $CO_2$ pipeline 104 extends to an area of the sea where such conditions are met, and then carbon dioxide hydrate 106 or its slurry is discharged. The discharged carbon dioxide hydrate 106 goes down and accumulates on an ocean floor because it has a larger specific gravity than seawater.

Next, we shall show concrete figures for the above embodiments.

Carbon dioxide hydrate is mixed with water (fresh water) at 50 ata and 10.3° C. to produce carbon dioxide hydrate. When the pressure of the compressor 101 is chosen appropriately, carbon dioxide hydrate can be sufficiently produced even at a depth of 500 M and at a seawater temperature of 2° C., for example.

To carbon dioxide transported into the region of this depth and this seawater temperature, fresh water transported by the water pump 107 on the ground and cooled by the surrounding seawater through the water pipeline 105 is added to produce carbon dioxide hydrate 106. The addition of water is not restricted to this form. The seawater pump 108 can also be disposed at a suitable position in the sea, and cold seawater nearby can be supplied to liquified carbon dioxide with this pump 108.

While 1.0 mole of carbon dioxide reacts on average with 7.3 moles of water to produce carbon dioxide hydrate, carbon dioxide dissolves into water about 10% at 50 ata. Therefore, in the case of producing a carbon dioxide hydrate slurry with 50 ton/hr of carbon dioxide hydrate and 50 ton/hr of water, for example, 17.1 ton/hr of carbon dioxide and 82.9 ton/hr of water need to react with each other. (Of 17.1 ton/hr of carbon dioxide, 12.5 ton/hr becomes the hydrate and the rest dissolves into water.)

As we have described above, because heat (80 kcal per kg of the hydrate) is generated when carbon dioxide hydrate is produced, this heat of formation has to be somehow released in order to produce carbon dioxide hydrate slurry and discharge it into the sea. This release of the heat of formation is done through a pipeline by way of indirect cooling with seawater, and a pipeline of 10 in. diameter needs to have a length of about 10.4 km from the point where seawater is added to carbon dioxide (the extended portion of the $CO_2$ pipeline). Of course, if the diameter of the pipe is larger, the length of the pipeline can be shorter.

The carbon dioxide slurry 106 from which the heat of formation has been removed as described above is discharged into the sea stably and goes down to the bottom of ocean because its specific gravity is greater than seawater.

Embodiment 4

With reference to FIG. 7, we shall describe embodiment 4 for a first apparatus of the present invention.

Figure 9:
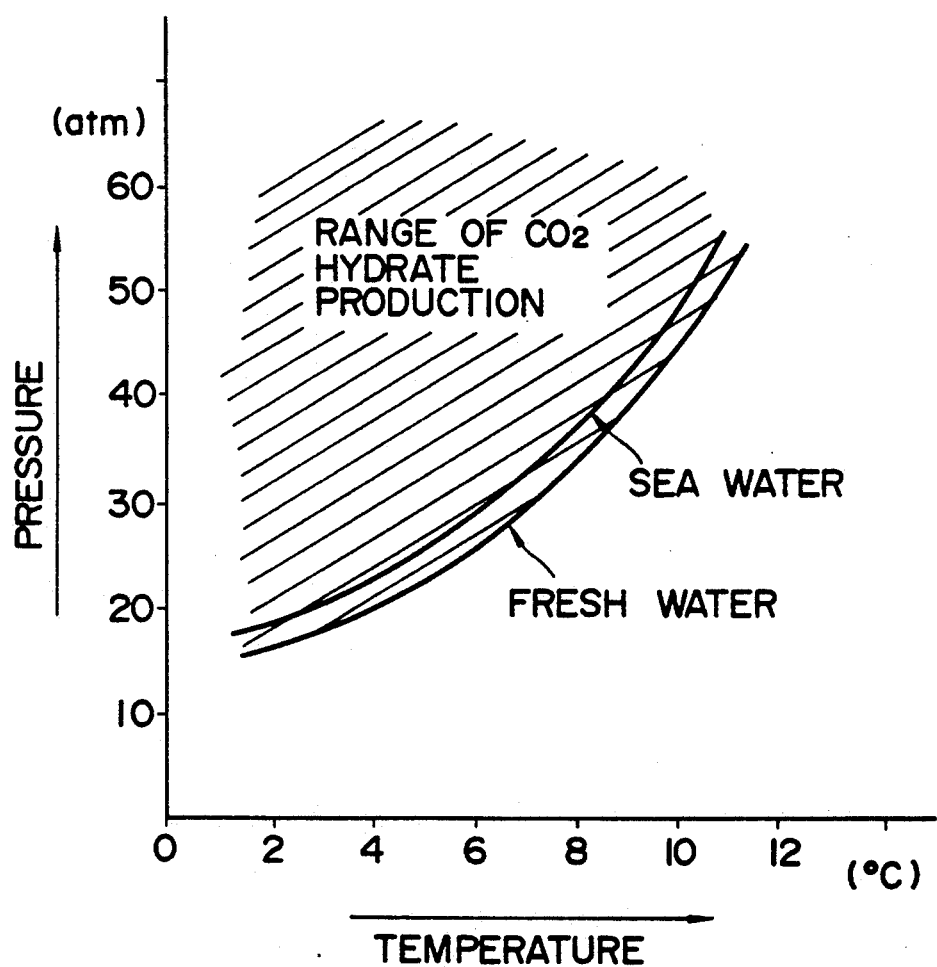
FIG. 9 shows temperature and pressure conditions required for the formation of carbon dioxide hydrate.

This apparatus is placed in the seawater 210 which satisfies the pressure and temperature conditions for the formation of carbon dioxide hydrate shown in FIG. 9.

The carbon dioxide 207 which is continuously supplied to a container 201 from a carbon dioxide supply opening 202 comes into contact with the seawater which is injected through a plurality of injection ports 203 disposed on the side wall of the container 201 and which satisfies the pressure and temperature conditions for the production of carbon dioxide hydrate, and moves toward an outlet opening 206 as the hydrate 209 is produced. The product carbon dioxide hydrate 209 is a solid. In order to prevent it from sticking to the inner wall of the container 201, therefore, a screw 205 whose diameter is close to the inner diameter of the container 201 is driven by a motor 204 so as to discharge the hydrate 209 from the apparatus through the outlet opening 206.

The heat generated when carbon dioxide hydrate forms is released through the wall of container 201 into surrounding seawater. Because the hydrate discharged from the apparatus has a larger specific gravity than surrounding seawater, it goes down and accumulates on an ocean floor.

The length and the diameter of the container are determined based on the amount of carbon dioxide and seawater supplied and on the pressure and the temperature which the apparatus feels at its: they should be sufficient for the formation of carbon dioxide hydrate.

An example of the apparatus had an inner diameter (d) of 100 M and a length (L) of 10 M and was placed in the sea at a depth of 250 M and at a water temperature of 2° C. When 10 kg/hr of carbon dioxide and 30 kg/hr of seawater are supplied, the supplied carbon dioxide became carbon dioxide hydrate sufficiently, and through the discharge means the product went down to an ocean floor and accumulated.

Embodiment 5

With reference to FIG. 8, we shall describe another embodiment of the first apparatus of the present invention.

Carbon dioxide 207 sent under pressure and fresh water or seawater 208 mix with each other in a container 212. The container 212 is disposed in the seawater or fresh water 210 which satisfies the appropriate temperature and pressure conditions for the production of carbon dioxide hydrate 209. Carbon dioxide hydrate 209 is a solid. When it sticks to the inner wall of the container 212, the hydrate can be discharged by the pressure of the carbon dioxide 207 and the seawater or fresh water 208 supplied.

The length and the diameter of the container 212 are adjusted based on the amount of carbon dioxide and seawater or fresh water and on the pressure and temperature conditions at the location of the container. They should be sufficient for the formation of carbon dioxide hydrate.

Because the hydrate discharged out of the apparatus has a larger specific gravity than surrounding seawater, it goes down and accumulates on an ocean floor.

Embodiment 6

Figure 10:
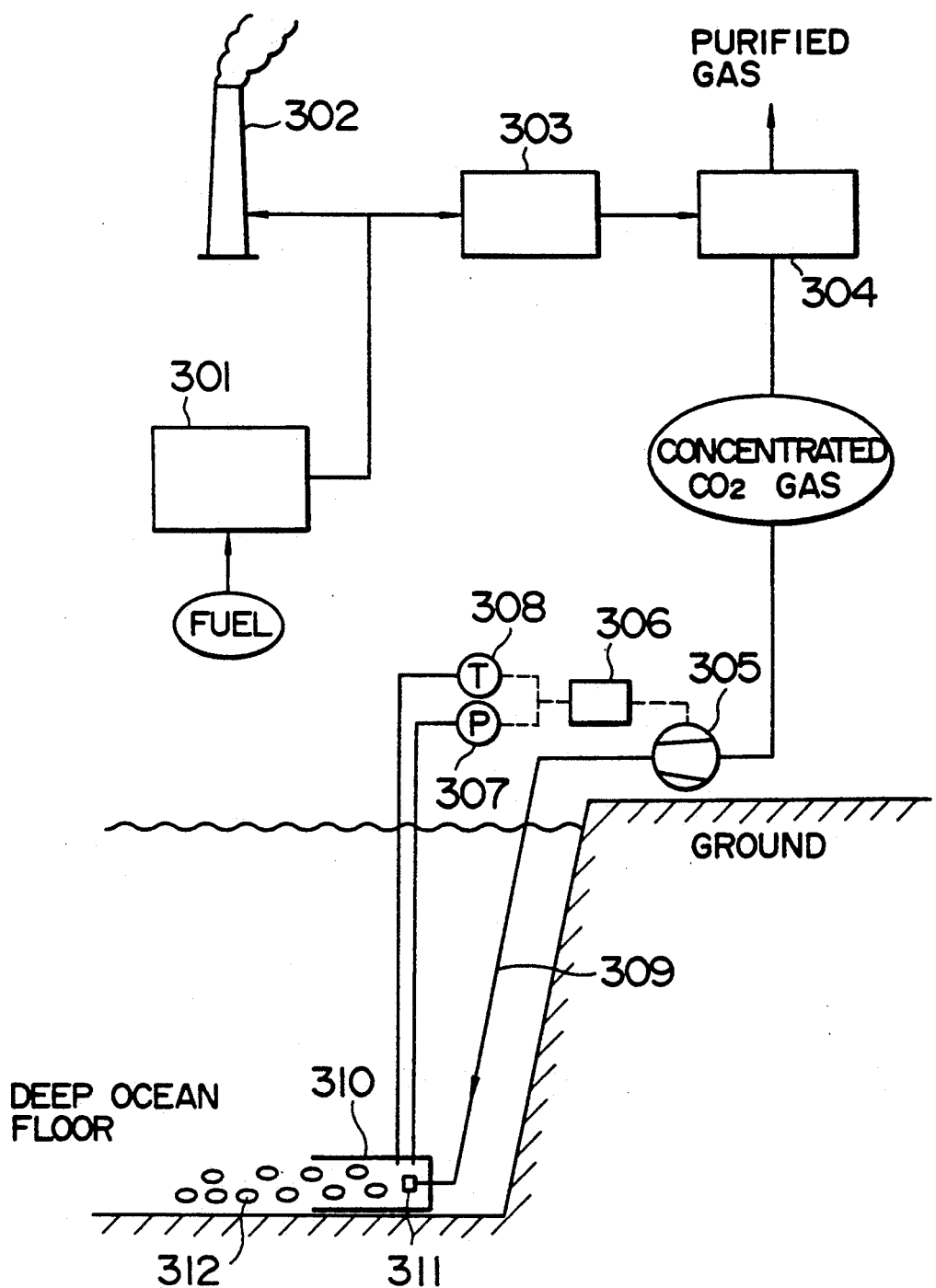
FIG. 10 is a diagram showing the entire structure, including the location at which it is placed, of a second apparatus of the present invention for describing the functions thereof.

FIG. 10 shows the entire structure of the apparatus for the treatment of carbon dioxide present in combustion exhaust gas according to the present invention.

All or a part of exhaust gas containing carbon dioxide gas which comes out of a combustion furnace 301 and all of which has previously been discharged through a smokestack 302 is introduced to a preliminary treatment apparatus 303 so as to cool and remove unburned carbon, and then at a carbon dioxide separator 304, only carbon dioxide is separated and concentrated. The gas which is no ree of carbon dioxide is released into the atmo purified gas. Next, the concentrated as is pressurized by a compressor 305 ocean floor through a pipeline 309 reaction device 310 from a nozzle p of the pipeline. The pressure and he reaction device 310 are sensed e 307 and a thermometer 308, re- utlet pressure of the compressor pressure controller 306. Because carbon dioxide ate 312 is produced in the reaction device 310 located at the ocean floor on which the measured temperature and pressure satisfy the conditions for the production of the hydrate, it can be fixed on a deep ocean floor almost permanently by dispersing it there.

Figure 11:
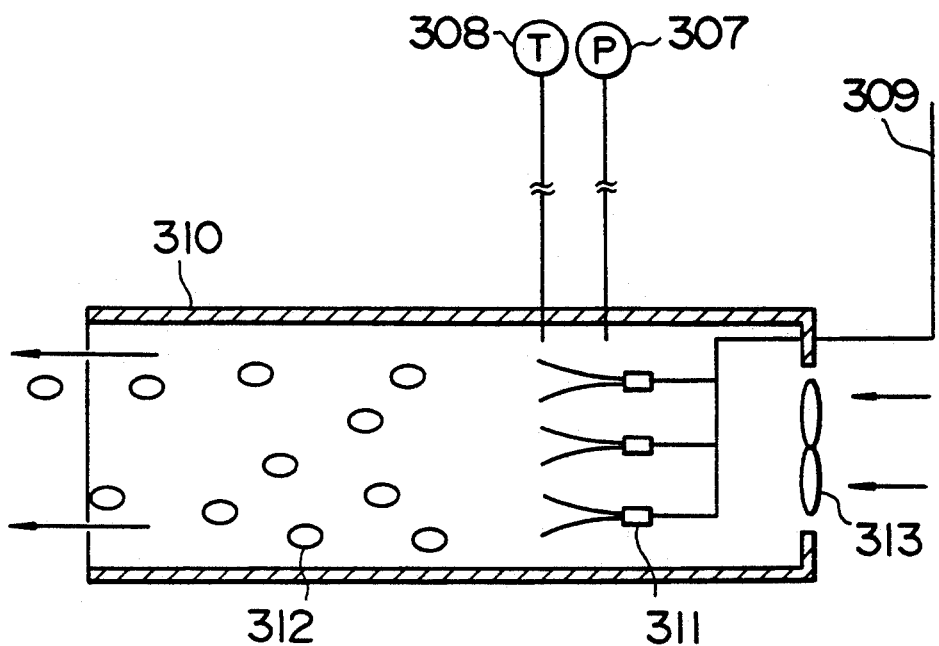
FIG. 11 shows the structure of an embodiment of the reaction device used with the above apparatus.

FIG. 11 shows details of the structure of the reaction device 310 for the production of carbon dioxide hydrate. One or a plurality of nozzles 311 are disposed to form an end of the pipeline 309, and the reaction device 310 is walled in to have upper and lower and side faces (though the lower wall can be omitted) so as to prevent unreacted carbon dioxide from escaping to the outside. Also, the nozzles 311 have an elongated structure in the direction of ejection such that the reaction time (residence time) for the formation of the hydrate is sufficiently large. Further, a driven propeller 313 is disposed at the inlet portion of the reaction device 310 in order to generate a flow of seawater for moving and dispersing the product carbon dioxide hydrate out of the device 310.

Figure 12:
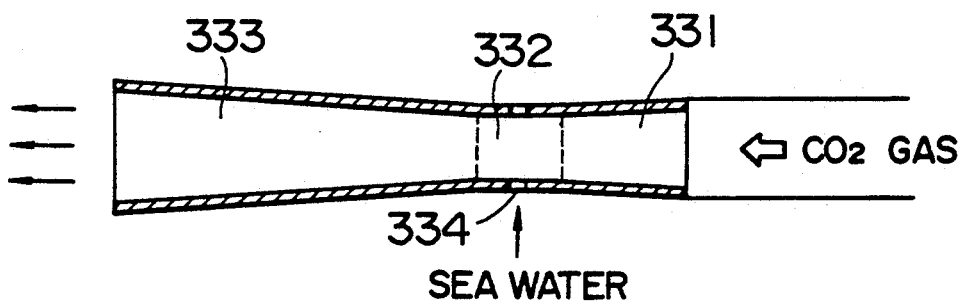
FIG. 12 shows the structure of an embodiment of the ejector nozzle disposed in the reaction device of FIG. 11.
Figure 13:
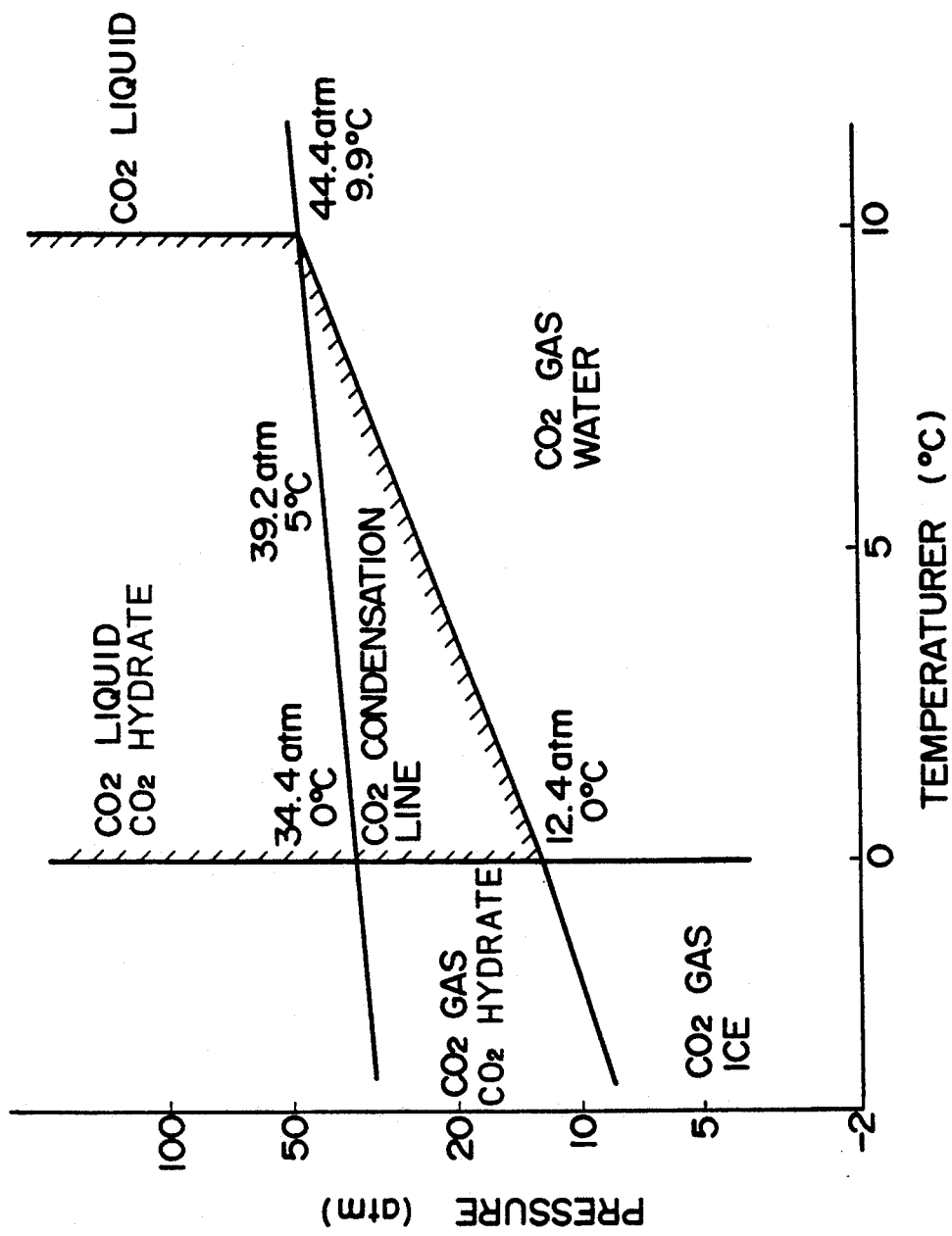
FIG. 13 shows the phase equilibrium of a $CO_2$-$H_2O$ system.
Figure 14:
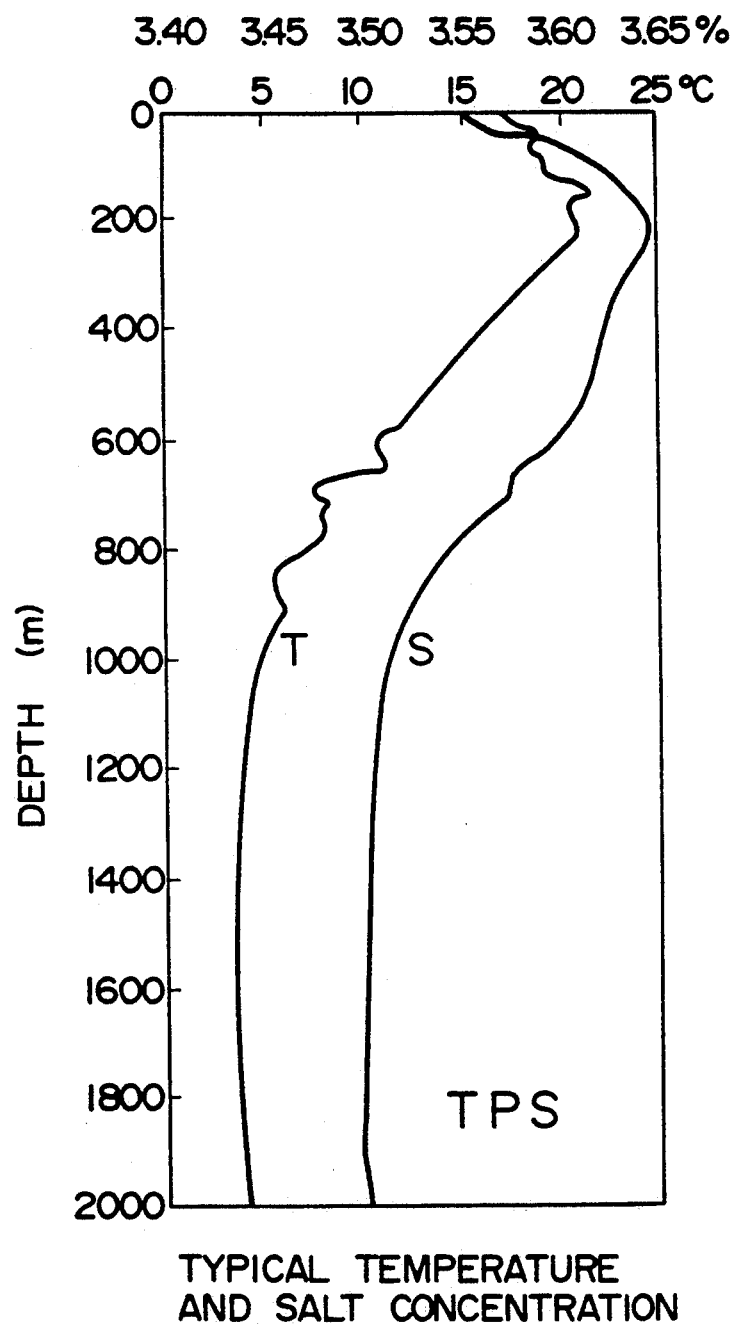
FIG. 14 shows typical relations between ocean depth and temperature as well as salt concentration.

FIG. 12 shows details of the structure of the ejector type nozzle 311. This nozzle 311 comprises a contracting tube 331, a parallel tube 332 and an expanding tube 333, and the parallel tube 332 has an opening 334. In this nozzle 311, the pressure in the parallel tube 332 becomes lower, and therefore seawater is sucked in from the outside through the opening 334. The seawater mixes sufficiently with carbon dioxide gas in the nozzle 311, and a fine mixture of carbon dioxide and seawater is ejected from an ejection outlet.

We claim:

1. An apparatus for reducing the amount of carbon dioxide released into the atmosphere by fixing and dumping carbon dioxide which is disposed in seawater or fresh water satisfying certain temperature and pressure conditions for the formation of carbon dioxide hydrate or its clathrate comprising:
   a) a transport pipeline equipped with a compressor;
   b) a carbon dioxide source connected to said transport pipeline upstream of said compressor;
   c) a plurality of ejector nozzles disposed at one end of the pipeline;
   d) a reaction housing which allows seawater or fresh water and carbon dioxide to react with each other and form the carbon dioxide hydrate or its clathrate;
   e) a dispersing propeller;

wherein the reaction device is provided with the ejector nozzles and the dispersing propeller at the inlet portion of the device; the concentration of the carbon dioxide is supplied into the pipeline and is discharged by the compressor into the reaction housing from the ejector nozzles under pressure to form the carbon dioxide hydrate or its clathrate; the thus produced hydrate or its clathrate is dispersed by the propeller out of the reaction housing to the deep bottom of the sea.

2. An apparatus according to claim 1 wherein the inner diameter and length of the reaction device is 100 mm and 10 m respectively at a temperature of 2° C. and a depth of 250 m which is sufficient for the formation of carbon dioxide or its clathrate.

3. An apparatus according to claim 1 wherein one of the ejector nozzles comprises a contracting tube, a parallel tube and an expanding tube; the parallel tube having an opening; such that when the pressure in the parallel tube becomes low, the seawater is sucked in from the outside through the opening and mixes with the carbon dioxide in the nozzle and a fine mixture of carbon dioxide and seawater is ejected from the ejection outlet.

4. An apparatus according to claim 1 wherein the ejector nozzles have elongated structure in the direction of the ejection such that the reaction time for the formation of the hydrate or its clathrate is sufficiently long.

* * * * *

UNITED STATES PATENT AND TRADEMARK OFFICE
CERTIFICATE OF CORRECTION

PATENT NO. : 5,304,356
DATED      : April 19, 1994
INVENTOR(S): IIJIMA et al.

It is certified that error appears in the above-identified patent and that said Letters Patent is hereby corrected as shown below:

On the title page, left column at [30], "Sep. 7, 1990 [JP] Japan ...... 2-35754" should read --Sep. 7, 1990 [JP] Japan ...... 2-235754--.

Signed and Sealed this

Thirteenth Day of September, 1994

Attest:

BRUCE LEHMAN

Attesting Officer

Commissioner of Patents and Trademarks